(12) United States Patent
Mathews et al.

(10) Patent No.: US 7,394,822 B2
(45) Date of Patent: Jul. 1, 2008

(54) USING REASSEMBLY QUEUE SETS FOR PACKET REASSEMBLY

(75) Inventors: Gregory S. Mathews, Santa Clara, CA (US); Eric Anderson, Palo Alto, CA (US); Philip Ferolito, Sunnyvale, CA (US); Mike Morrison, Sunnyvale, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 873 days.

(21) Appl. No.: 10/454,298

(22) Filed: Jun. 4, 2003

(65) Prior Publication Data

US 2003/0223458 A1 Dec. 4, 2003

Related U.S. Application Data

(60) Provisional application No. 60/385,977, filed on Jun. 4, 2002, provisional application No. 60/385,953, filed on Jun. 4, 2002.

(51) Int. Cl.
*H04L 12/28* (2006.01)
*H04L 12/56* (2006.01)
*H04J 3/24* (2006.01)

(52) U.S. Cl. ...................... 370/412; 370/474

(58) Field of Classification Search ................ 370/474, 370/465–466, 468, 366, 412–418, 432, 230.1, 370/231–232, 235
See application file for complete search history.

(56) References Cited

U.S. PATENT DOCUMENTS

| | | | | |
|---|---|---|---|---|
| 5,999,518 A | * | 12/1999 | Nattkemper et al. | 370/258 |
| 6,741,552 B1 | * | 5/2004 | McCrosky et al. | 370/218 |
| 6,975,638 B1 | * | 12/2005 | Chen et al. | 370/412 |
| 6,996,058 B2 | * | 2/2006 | Foster et al. | 370/228 |
| 7,158,528 B2 | * | 1/2007 | Dell et al. | 370/416 |
| 2002/0089977 A1 | * | 7/2002 | Chang et al. | 370/386 |

OTHER PUBLICATIONS

Kyle Loudon, "Mastering Algorithms with C" Aug. 1999, Section 5.5.*

* cited by examiner

*Primary Examiner*—Seema S. Rao
*Assistant Examiner*—Jianye Wu

(57) ABSTRACT

A system for efficiently reassembling packets from cells received on independent switching fabrics according to a serial high speed interface (HSI) protocol. The system includes redundancy in that fabrics may be removed by skipping the fabrics in striping and reassembly sequences. When fabrics are added, the fabrics are included in the striping and reassembly sequences. The system is efficient due in part to in-order transmission of cells serially across multiple fabrics. Full fabric bandwidth is thereby utilized without reordering overhead. Since packets are striped across all available fabrics, load is balanced across the fabrics.

21 Claims, 12 Drawing Sheets

USING REASSEMBLY QUEUE SETS FOR PACKET REASSEMBLY

CROSS REFERENCE TO RELATED APPLICATION

This application is entitled to the benefit of provisional Patent Application Ser. No. 60/385,977, filed 04 Jun. 2002 and provisional Patent Application Ser. No. 60/385,953, filed 04 Jun. 2002.

FIELD OF THE INVENTION

The present invention relates generally to packet-based traffic forwarding, and more particularly to reassembling packets that have been broken into cells for transmission across a switching fabric.

BACKGROUND OF THE INVENTION

Packet-switched networks are responsible for forwarding packet-based traffic. In some hardware devices, such as switches and routers, packets are broken into fixed-length cells and forwarded from an ingress, across a switching fabric, to an egress, where the cells are typically reassembled into packets.

In systems with multiple switching fabrics, cells may be forwarded in parallel or serially. In a parallel configuration, cells associated with a packet are sent across a single fabric. Different packets may be sent simultaneously across different fabrics. In this configuration, an ordering protocol may be required to ensure that packets sent across different fabrics remain in proper order once received at the egress or possibly to ensure that packets which must be ordered relative to one another are sent serially across a single fabric. In a serial configuration, cells associated with a packet are sent across multiple fabrics. A packet in the process of being sent, i.e., a packet for which some but not all of its associated cells have been sent from the ingress to the egress, may be referred to as an in-flight or active packet. Packets that must be ordered relative to the in-flight packet must wait to be sent until the last cell of the in-flight packet is sent.

Ordering protocols typically entail a reordering overhead in both parallel and serial configurations. Systems with a substantial number of in-flight packets, ingress queues, and egress queues, often have additional ordering mechanisms such as ordering identifiers (IDs), semaphores to indicate packets received/IDs available for reuse, storage elements to track current positions, available IDs, etc. Ordering mechanisms may also reduce system bandwidth by delaying out-of-order packets that have been transmitted across a fabric until in-order packets are received. This would typically appear as an idle period followed by bursts of traffic at the egress output. Idle periods represent lost bandwidth that typically cannot be recovered. Similarly, for a plurality of switching fabrics with cells arbitrarily sent through the switching fabrics to maximize bandwidth allocation, reordering mechanisms would be required to reassemble packets from the cells.

In view of the desire to minimize lost bandwidth in a system including a plurality of switching fabrics, what is needed is an efficient packet-based traffic forwarding system that includes optimal load balancing across a plurality of switching fabrics. It would be advantageous to include redundancy by utilizing independent switching fabrics in the system.

SUMMARY OF THE INVENTION

A technique for efficiently reassembling cells received across a plurality of switching fabrics into packets involves receiving cells from independent switching fabrics. The advantages of utilizing this technique include redundancy, efficiency, and load balancing. Redundancy is achieved by utilizing a set of independent fabrics in the methodology set forth above. It is possible to add and remove fabrics without a loss of functionality by adding or deleting the fabrics from the striping and reassembly sequences according to the tequnique. Fabric composite performance can be similarly scaled by the addition or removal of the independent fabric modules. In a system where the composite fabric bandwidth is greater than the maximum system bandwidth required, addition and removal of fabrics could be achieved without the loss of performance. In addition, because all working fabrics are used in the striping methodology, as opposed to using only the number of fabrics required to meet system bandwidth requirements, excess fabrics which supply redundancy are constantly tested through use, and provide additional fabric resources, buffering, or elasticity for bursts of traffic that temporarily exceed maximum sustainable bandwidth.

Efficiency is achieved because packets are transmitted from an ingress queue to a particular egress queue in-order. In addition, the egress maintains separate reassembly queues on a per ingress basis. This allows the full fabric bandwidth to be utilized without packet reordering overhead. For example, if a set of four fabric links is used where packets are not striped (i.e., each packet is transferred across one link from start to finish), then four packets of arbitrary size being transferred from an ingress queue to the same egress queue would either be restricted to a single fabric (performance loss) or would require an ordering indicator so the egress could place them back into the original order. For a system with a substantial number of packets in flight, ingress queues, and egress queues, the resources required would multiply (such resources include ordering IDs, semaphores to indicate packets received/IDs, available for reuse, storage elements to track current positions, available IDs, etc). Moreover, these ordering mechanisms can reduce system bandwidth as out-of-order packets that have already been transferred across the fabric wait for the first packet in order to be received. This would appear as IDLEs followed by bursts of traffic at the egress output, where IDLEs represent lost bandwidth that typically cannot be recovered. Similarly, far a set of four fabric links where cells of packets can be arbitrarily distributed among any fabric to maximize fabric bandwidth utilization, reordering mechanisms would be required to reassemble packets out of cells.

Load balancing is achieved since a particular packet will be striped across all available fabrics. Each fabric thereby gets an even share of packet traffic. Load balancing maximizes the availability of fabric buffers that can be used to compensate for bursty traffic and for incidents where multiple ingresses target the same egress. And evenly loaded fabrics will yield a higher composite throughput than a system with unevenly loaded fabrics (assuming that the fabrics are of equivalent capability and the system traffic is non-trivial).

In an embodiment, a method of reassembling cells received across a plurality of switching fabrics into packets includes using the above-described techniques to efficiently reassemble cells received across a plurality of independent switching fabrics into packets.

Exemplary figures illustrate exemplary methods and systems for reassembling packets using cells received across a plurality of switching fabrics. Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
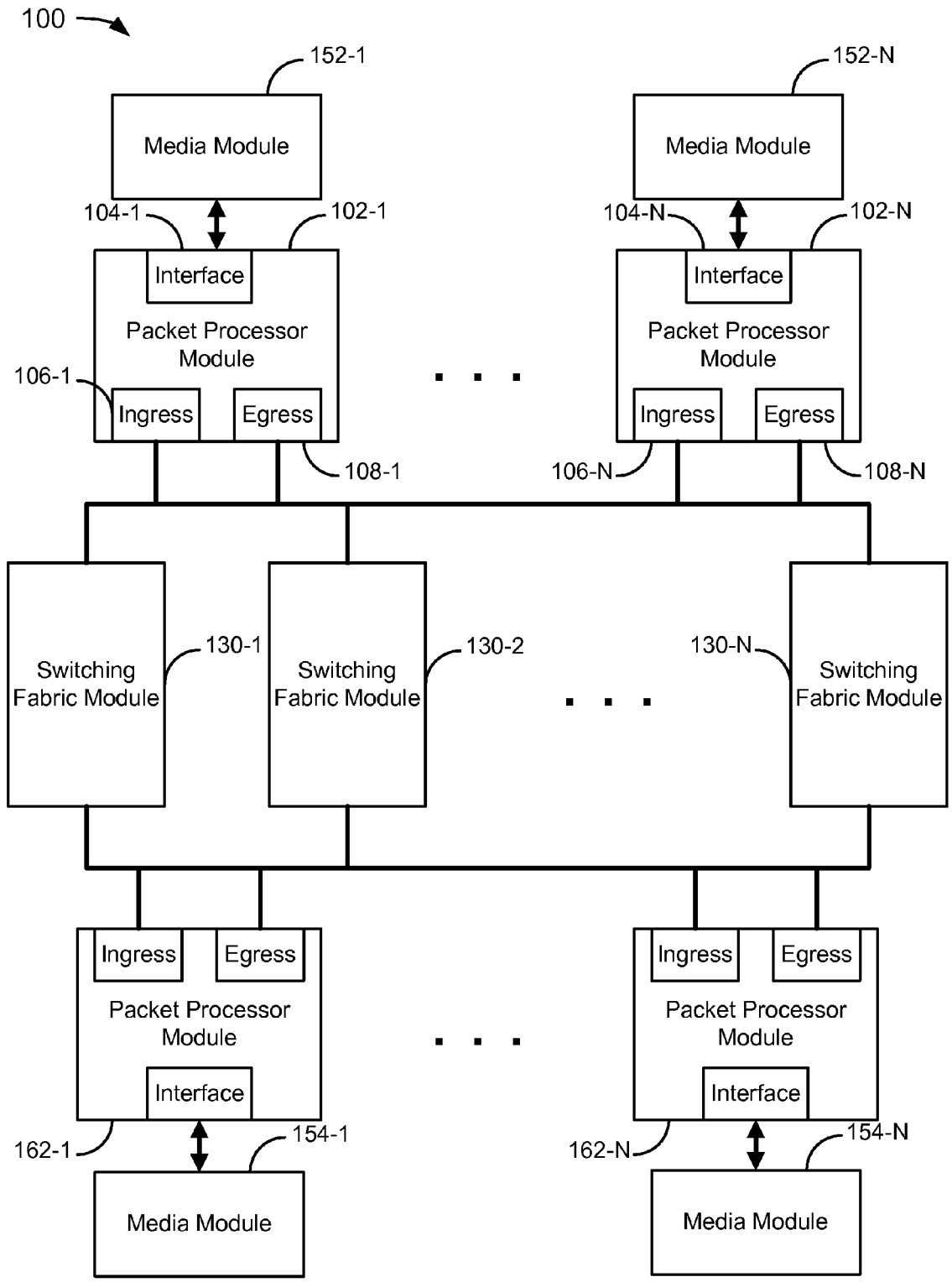
FIG. 1 is a block diagram of a traffic forwarding system in accordance with an embodiment of the invention.

As shown in the drawings for the purposes of illustration, an embodiment of the invention is a system for reassembling packets using cells received across a plurality of switching fabrics.

FIG. 1 is a block diagram of a traffic forwarding system 100 in accordance with an embodiment of the invention. The system 100 includes media modules 152-1 to 152-N and 154-1 to 154-N, packet processor modules 102-1 to 102-N (referred to collectively as the packet processor modules 102) and 162-1 to 162-N (referred to collectively as the packet processor modules 162), and switching fabric modules 130-1 to 130-N (referred to collectively as the switching fabric modules 3130). The media modules 152-1, 152-N, 154-1, and 154-N are respectively coupled to the packet processor modules 102-1, 102-N, 162-1, and 162-N. It should be noted that catch packet processor module may be coupled to one or more media modules. The packet processor modules 102 and 162 are coupled to the switching fabric modules 130. The switching fabric modules 130 include circuitry to replicate cells by writing to multiple buffers. This functionality may be used with multicast cells that target a plurality of egress destinations. The packet processor module 102-1 includes an interface module 104-1 for forwarding packets to and from the media module 152-1, an ingress module 106-1 for forwarding cells to the switching fabric modules 130, and an egress module 108-1 for receiving cells from the switching fabric modules 130. The packet processor modules 102 and 162 have comparable components and couplings. In an embodiment, the interface modules 104 are configured to receive packets. If a packet is too large to fit in a single cell, it is broken into portions and each portion is encapsulated in a separate cell. In an embodiment, the system 100 is an Ethernet switch or an Ethernet router that forwards traffic within the system 100 using Layer 2, Layer 3, and/or Layer 4 header information. The system 100 may include line cards that support network protocols such as Ethernet, ATM, and Frame Relay. Although an Ethernet-based switch/muter is described, the disclosed cell reassembly techniques can be applied to any system that has multiple switching fabrics.

Figure 2:
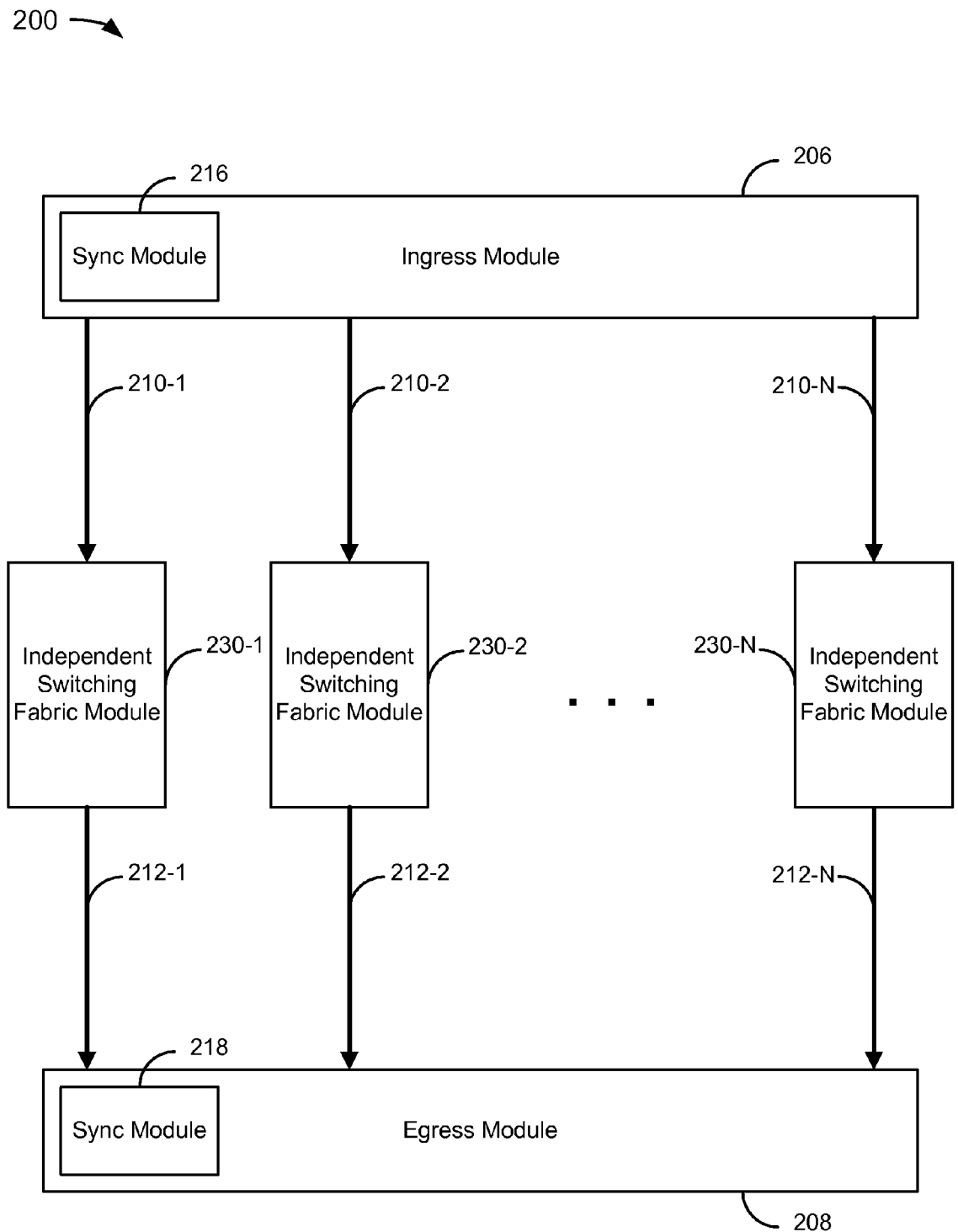
FIG. 2 is a block diagram of a traffic forwarding subsystem for use with the system of FIG. 1 in an embodiment of the invention.

FIG. 2 is a block diagram of a traffic forwarding subsystem 200 for use with the system 100 of FIG. 1 in an embodiment of the invention. The subsystem 200 includes an ingress module 206, independent switching fabric modules 230-1 to 230-N (referred to collectively as the independent switching fabric modules 230), and an egress module 208. The ingress module 206 includes a synchronization module 216. The egress module 208 includes a synchronization module 218. FIG. 2 is intended to illustrate an embodiment of the invention wherein each of the independent switching fabric modules 230 is coupled to the ingress 206 by respective high speed interfaces (HSIs) 210-1 to 210-N. Similarly, each of the independent switching fabric modules 230 is coupled to the egress 208 by respective HSIs 212-1 to 212-N. The synchronization module 216 detects whether one or more of the independent switching fabric modules 230 are unavailable so that unavailable switching fabrics can be skipped when striping cells from the ingress module 206 across the independent switching fabrics 230. The synchronization module 216 may communicate this and other synchronization information to the egress module 208. The synchronization module 218 detects whether one or more of the independent switching fabric modules 230 are unavailable so that unavailable switching fabrics can be skipped when reassembling cells received across the independent switching fabrics 230. The synchronization modules 216 and 218 are designed to communicate such that packets may be reassembled from cells received across an unavailable switching fabric before it became unavailable and from cells received across available switching fabrics before and after an unavailable switching fabric became unavailable (and is skipped in the reassembly process). In an embodiment, the synchronization module 218 includes a fabric test block that receives hardware test cells. These test cells are configured to help keep the ingress 206 and egress 208 properly synchronized.

Figure 3A:
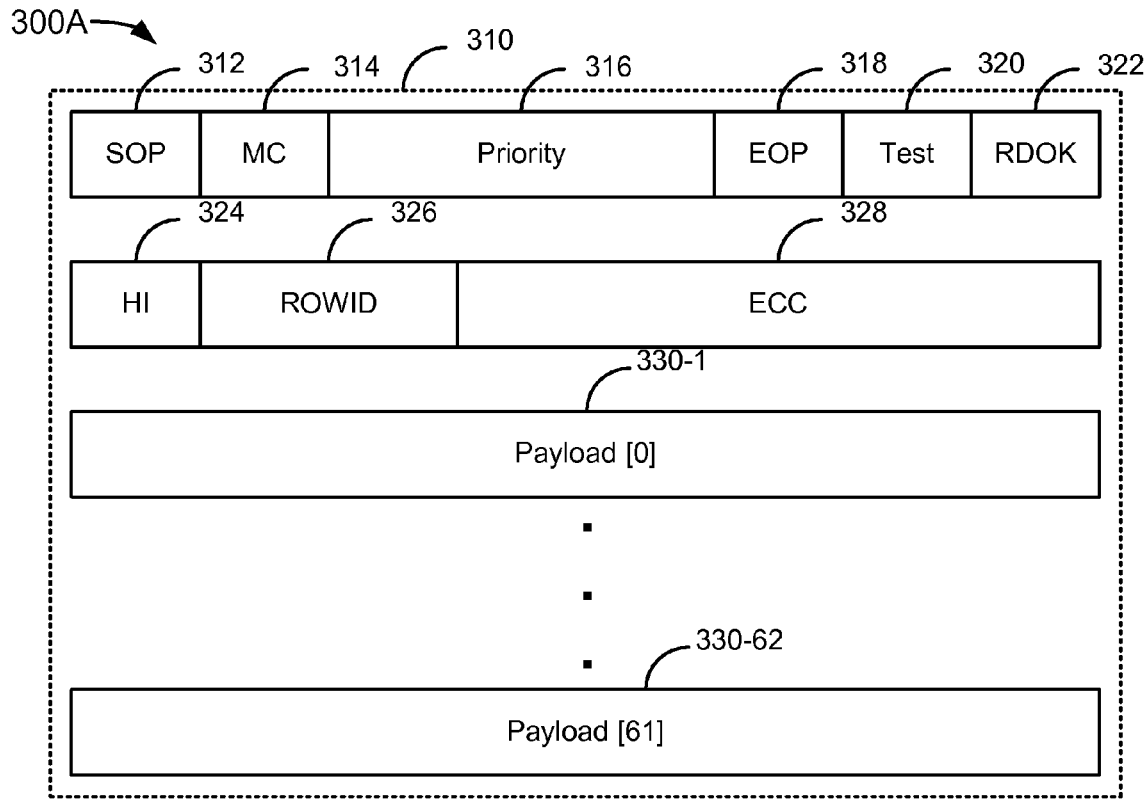
FIGS. 3A-3D are block diagrams of an exemplary cell and control information for use with the system of FIG. 1 in an embodiment of the invention.

FIG. 3A is a block diagram of an exemplary cell 300A for use with the system of FIG. 1 in an embodiment of the invention. The cell 300A includes a 64-byte cell portion 310. The 64-byte cell portion 310 includes a start-of-packet (SOP) flag 312, a multicast (MC) flag 314, a priority field 316, an end-of-packet (EOP) flag 318, a test flag 320, a read OK (RDOK) flag 322, a channel exit port (CEP) high (HI) flag 324, a row identifier (ROWID)/continuation field 326, an error check and correct (ECC) field 328, and a payload 330-1 to 330-62 (collectively referred to as the payload 330). The SOP flag 312 is set if a packet is broken into portions and the payload 330 of the cell 300A includes the first portion of the packet. A use for the SOP flag 312 is described with reference to FIGS. 7B and 8C, below. The MC flag 314 is set if the packet is multicast and not set if the packet is unicast. The priority field 316 contains the priority of the packet. In an embodiment, packets having different priorities are forwarded to, forwarded from, and reassembled in different queues, as described with reference to FIGS. 7-8, below. The EOP flag 318 is set if the payload 330 of the cell 300A includes the last portion of the packet. In an embodiment, the EOP flag 318 is optional. A use for the EOP flag 318 is described with reference to FIGS. 7B and 8C, below. The test flag 320 is set if the cell 300A is a hardware test packet. Hardware test packets may be used to indicate whether switching fabrics are available, or for other purposes. The ingress module 106-1 sets the RDOK flag 322 if the egress module 108-1 on the same packet processor module can accept cells (e.g., the packet processor module is not full) from the switching fabric modules 130. The RDOK flag 322 is set during normal operation. The HI flag 324 is used in conjunction with a CEP field, as described with reference to FIG. 3B, to identify a set of egress ports. In an embodiment, the ROWID/continuation field 326 is a 2-bit rotating row identifier that is compared to a 2-bit running counter (one per unicast egress reassembly queue) at the egress if the cell 300A is a unicast cell. The function of the ROWID/continuation field 326 is explained in more detail with reference to FIGS. 5 and 6 for unicast cells. The function of the ROWID/continuation field 326 is explained in more detail with reference to FIG. 3B for multicast cells. The ECC field 328 is used for error checking and correction. The payload 330 includes a packet or a portion of a packet.

Figure 3B:
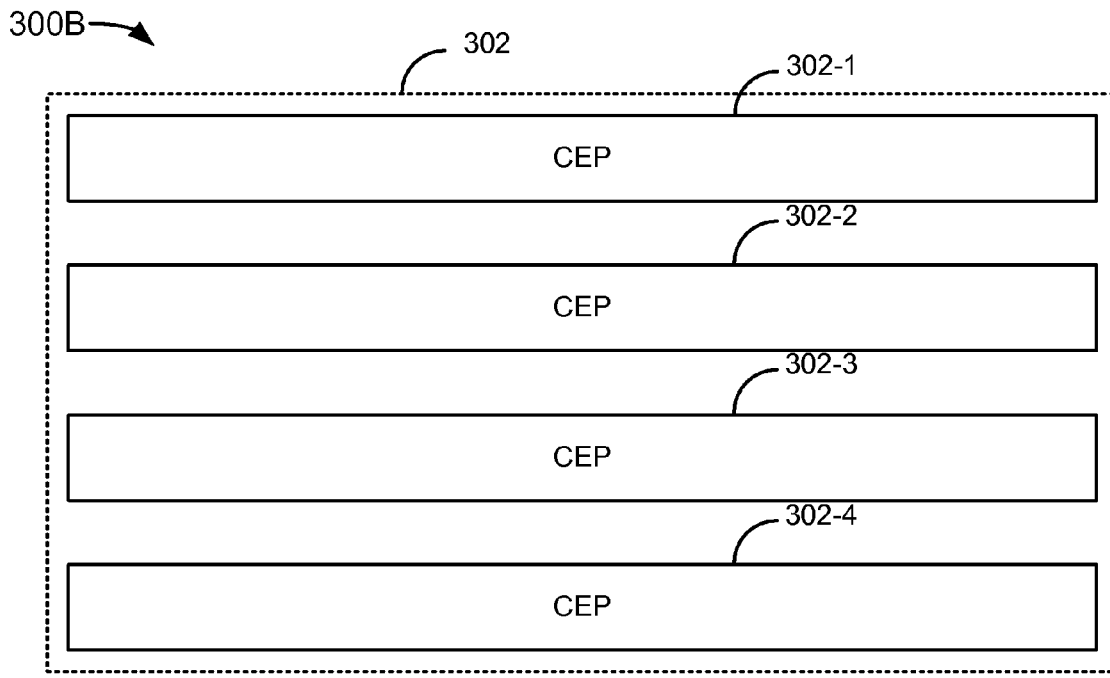

FIG. 3B is a block diagram of an exemplary ingress header 300B that may be associated with the cell 300A (FIG. 3A). The ingress header 300B includes a CEP field 302 with 4 bytes 302-1 to 304-4 of information. The ingress header 300B is associated with the exemplary cell 300A at an ingress prior to sending the exemplary cell 300A to the switching fabric modules 130 (FIG. 1). The CEP field 302 indicates one or more egress destinations of the cell to the switching fabric modules 130. The cell is replicated at the switching fabric modules if the cell has more than one egress destination such that the cell and each replicant have a single associated destination egress. The cell and each replicant are loaded into a buffer at a switching fabric module that corresponds to the single associated egress destination. Once the single associated egress destination has been determined, the CEP field 302 is no longer required and may be deleted or replaced with other control information such as the control information illustrated in FIG. 3C. It should be noted that the replicants are in fact cells and are hereinafter referred to simply as cells. In an embodiment, there are 64 egresses and the CEP field 302 includes 4 bytes of information, suitable for identifying up to 32 egresses (one bit per egress). If the HI flag 324 (FIG. 3A) is set, the up to 32 egresses identified by the CEP field 302 are the "high" egresses. If the HI flag 324 is not set, the up to 32 egresses identified by the CEP field 302 are the "low" egresses. Although in this embodiment some egresses are characterized as "high" and some egresses are characterized as "low", the characterization is not critical as long as the egresses are divided into two non-overlapping sets whose union yields the set of possible egresses and each set can be described with the CEP field 302. In an embodiment, the ingress may replicate the cell and send to the switching fabric modules 130 multiple times so long as the CEP fields 302, and the HI flags 324 provided for each replicant do not result in the cell being targeted to a given egress more than once.

In another embodiment, if the cell 300A is a multicast cell, the ROWID/continuation field 326 contains a continuation bit. For example, the first bit of the ROWID/continuation field 326 may be set to '0' and the second bit of the ROWID/continuation field 326 (the continuation bit) set to '0' or '1' depending upon whether the next multicast cell is a continuation of the current multicast cell. In an embodiment, the continuation bit is set to '1' when the EOP flag 318 of the current multicast cell is set and the next multicast cell to be sent by the same ingress at the priority of the current multicast cell to the set of egresses targeted by the current multicast cell will be sent to the set of egresses targeted by the current multicast cell. A use for the continuation bit is discussed with reference to FIGS. 4, 7A, and 7B.

Figure 3C:
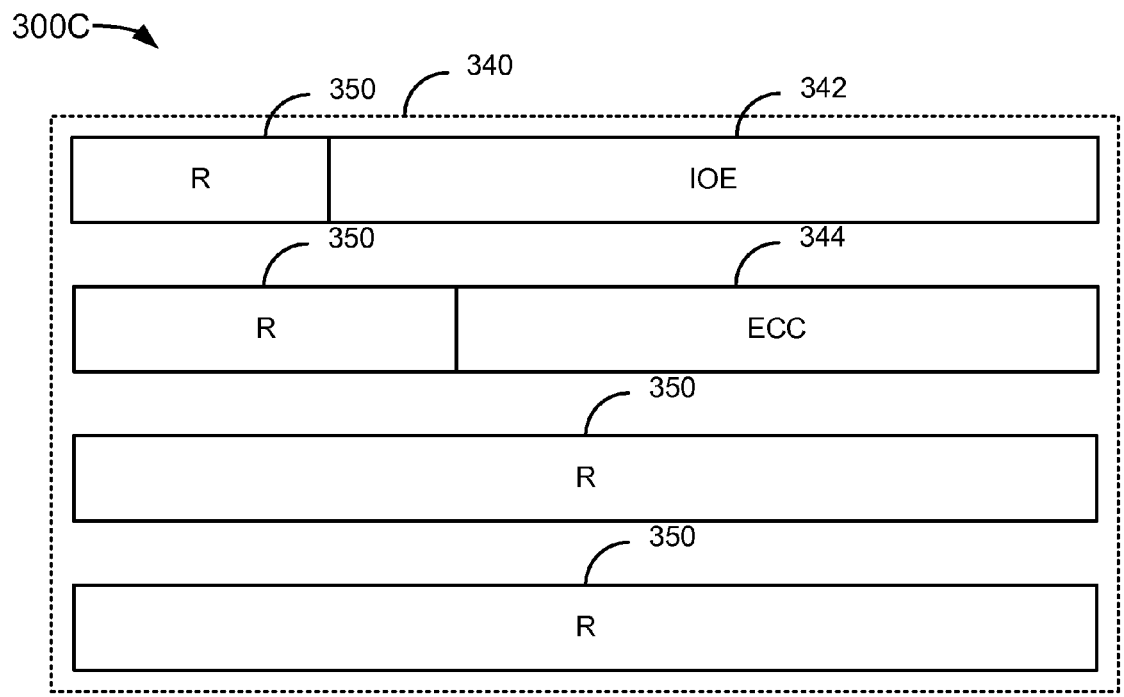

FIG. 3C is a block diagram of an exemplary egress header 300C that may be associated with the cell 300A (FIG. 3A). The egress header 300C includes a 4-byte egress control field 340. The egress control field 340 includes an ingress of entry (IOE) field 342, an ECC field 344, and reserved (R) fields 350. The IOE field 342 identifies the ingress from which the cell 300A was forwarded. A use for the IOE field 342 is provided with reference to FIG. 8C. The ECC field 344 is used for error checking and correction, but may be replaced at the egress with other control information, as described with reference to FIG. 3D. It should be noted that reference to a "cell" as used herein is generally a reference to the 64-byte cell portion 310.

Figure 3D:
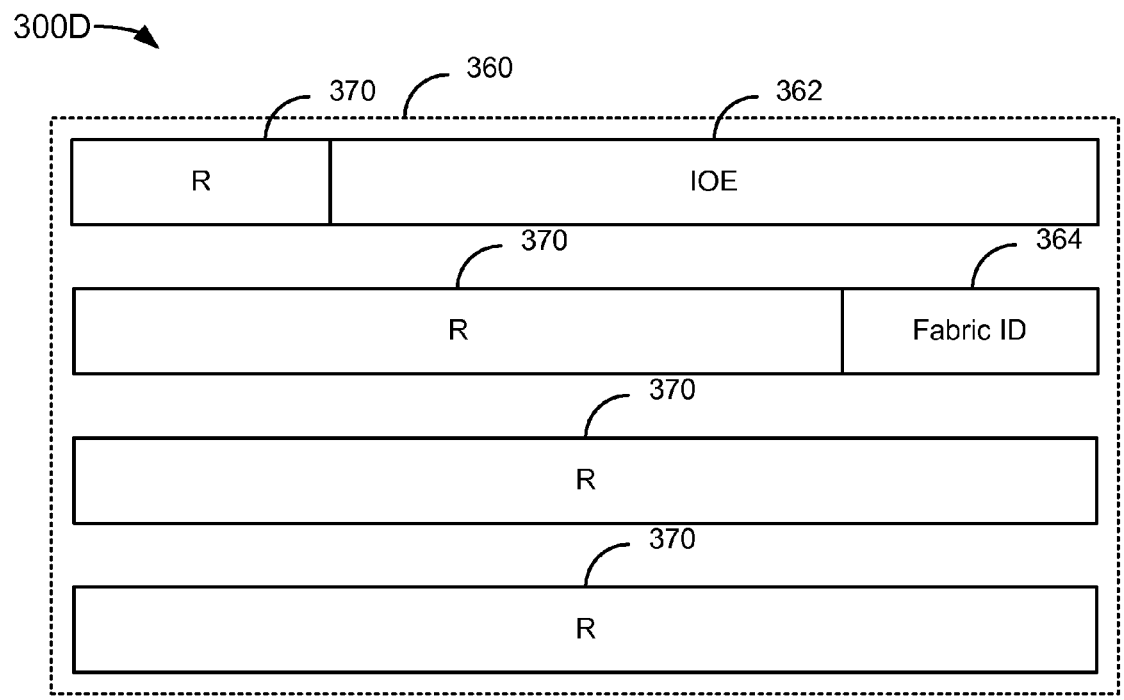

FIG. 3D is a block diagram of an exemplary egress header 300D that may be associated with the cell 300A (FIG. 3A). In an embodiment, after using the ECC field 344 for error checking and correction, the ECC field 344 is replaced with additional control information, including a fabric identifier (ID) 364. The fabric ID 364 identifies on which of the switching fabric modules 130 (FIG. 1) the cell associated with the fabric ID 364 was received at the egress. A use for the fabric ID 364 is described with reference to FIG. 8C.

Figure 4:
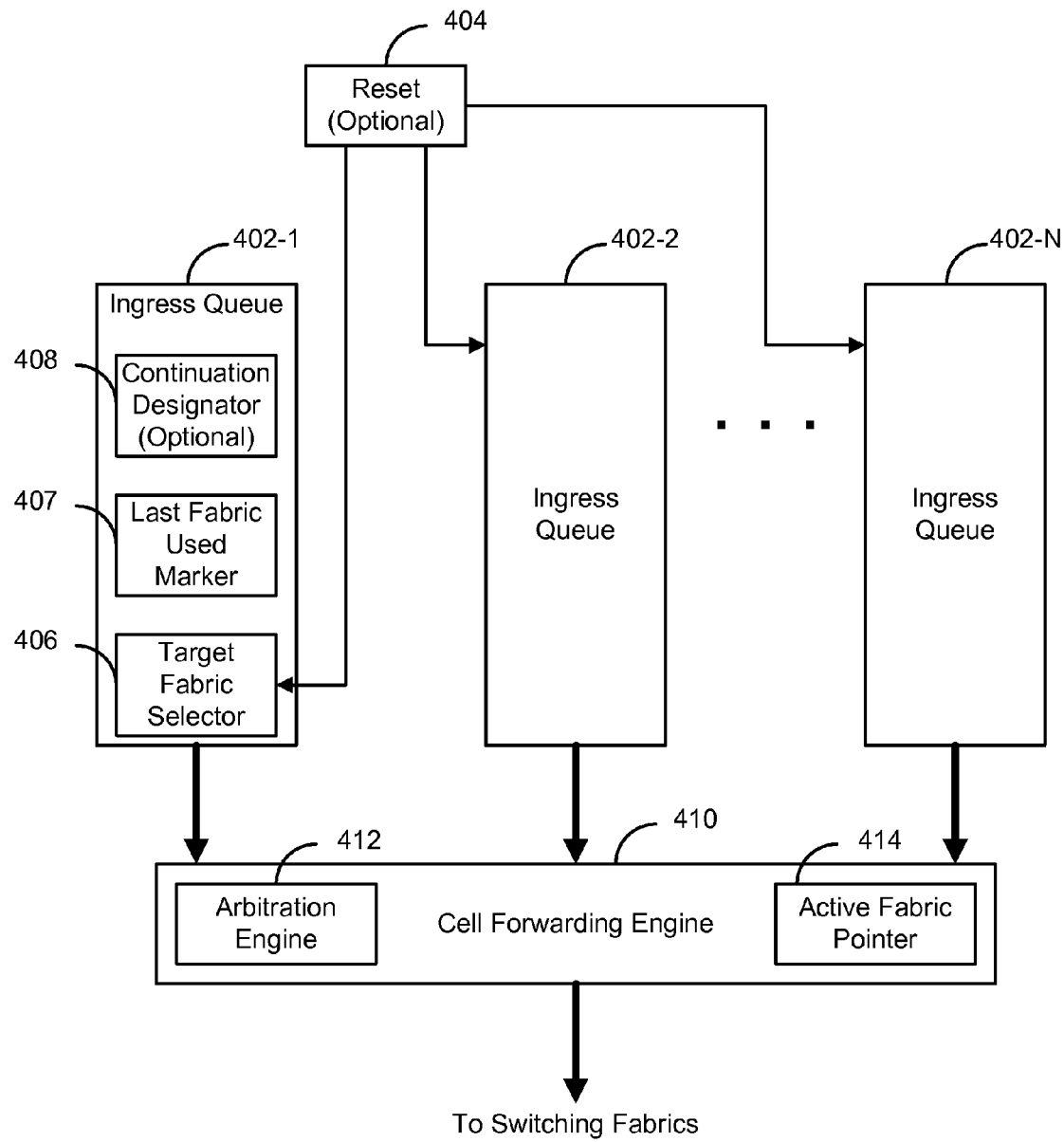
FIG. 4 is a block diagram of an ingress subsystem for use with the system of FIG. 1 in an embodiment of the invention.

FIG. 4 is a block diagram of an ingress subsystem 400 for use with the system 100 of FIG. 1 in an embodiment of the invention. In an embodiment, the subsystem 400 is analogous to the ingress module 206. The subsystem 400 includes ingress queues 402-1 to 402-N (referred to collectively as ingress queues 402), an optional reset field 404, and a cell forwarding engine 410. The ingress queue 402-1 includes a target fabric selector 406, a last fabric used marker 407, and an optional continuation designator 408. In an embodiment, the ingress queues 402-2 to 402-N have comparable components (not shown). The cell forwarding engine 410 includes an arbitration engine 412 and an active fabric pointer 414. In an embodiment, the reset field 404 and target fabric selector 406 are logical data structures. The reset field 404 may contain a reset value for the target fabric selector 406. The use of the reset field 404 and target fabric selector 406 is somewhat different depending upon whether the ingress queue 402-1 is unicast or multicast. In an embodiment, the reset field 404 is programmed only once when the ingress is operationally installed. Thus, the value in the reset field 404 is a fixed, programmable starting fabric value. Multicast target fabric selectors are typically reset to the value in the reset field 404 after a packet has been sent. To improve load balancing across the switching fabrics, the respective ingress reset fields could be programmed such that approximately the same number of ingresses have reset fields associated with each switching fabric. Unicast target fabric selectors vary over time and are typically not reset after sending a packet. Accordingly, unicast target fabric selectors may be initialized to zero and incremented over time, without reset following sending a packet.

A continuation bit prevents reset for multicast target fabric selectors. The continuation designator 408 sets a continuation bit if an EOP flag 318 (FIG. 3A) of a first multicast cell is set and the priority and set of egress destinations of the cell is identical to the priority and set of egress destinations of a next multicast cell. If this technique is used properly, multicast target fabric selectors are not reset if a next cell has the same egress destinations as the last cell of a preceding packet, thereby improving bandwidth utilization. However, cells from different ingress queues cannot be interspersed if they have overlapping egress targets at the same priority, except at packet boundaries. Accordingly, to avoid issues where a single multicast flow dominates traffic sent to the switching fabrics to the exclusion of other flows with overlapping egress targets, the multicast continuation bit may not be set if a minimum number of cells have been sent from a given ingress queue or if no cell follows the EOP cell in an ingress queue.

The ingress queues 402 are configured to contain cells and contend with one another to forward the cells. The order of forwarding is determined by the arbitration engine 412 that implements an arbitration algorithm in accordance with the target fabric selector 406 of a contending ingress queue 402, the active fabric pointer 414, and other considerations, as described below with reference to FIG. 8A.

A cell that wins arbitration at the cell forwarding engine 410 is forwarded to the active switching fabric module (e.g., an independent switching fabric module 230), using the active fabric pointer 414. Each time a cell is sent from an ingress queue 402 to an active switching module, the last fabric used marker 407 is updated with the active fabric pointer 414 value. In the event that a switching fabric changes status from available to unavailable or from unavailable to available, the target fabric selector 406 of all unicast ingress queues and multicast queues whose last cell sent was not an EOP cell with its continuation bit cleared will be retargeted to the first available fabric after the one specified in their last fabric used marker 407. When an EOP cell with a cleared continuation bit is sent from a multicast queue, the target fabric selector 406 associated with the multicast queue is retargeted to the multicast starting fabric (if it is available) or the first available fabric after the multicast starting fabric (if the multicast starting fabric is not available). In this way, along with the sequencing of cell striping described later with reference to FIG. 8A and the sequencing of packet reassembly described later with reference to FIG. 8C, striping cells across switching fabrics continues even as fabrics become available/unavailable. Although it is to be noted that before the ingress can send cells across the switching fabrics to the egress with fabrics added (newly available) or removed (newly unavailable) from the striping pattern, the egress must be made aware of the new pattern (available columns) and when to begin using the new pattern relative to the cells it has received or will receive.

Figure 5:
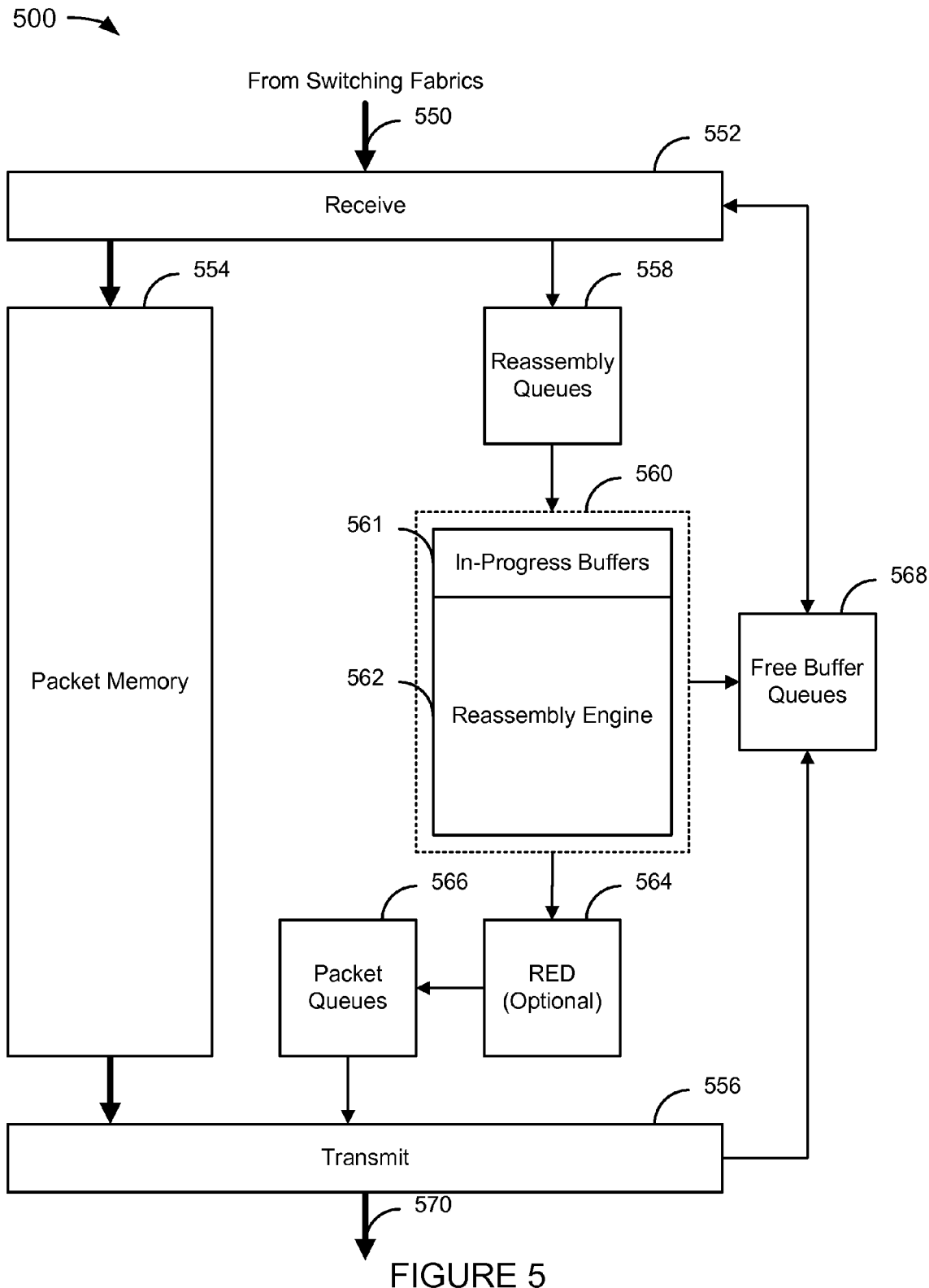
FIG. 5 is a block diagram of an egress subsystem for use with the system of FIG. 1 in an embodiment of the invention.

FIG. 5 is a block diagram of an egress subsystem 500 for use with the system of FIG. 1 in an embodiment of the invention. In an embodiment, the subsystem 500 is analogous to the egress module 208 of FIG. 2. The subsystem 500 includes a receive module 552, a packet memory 554, a transmit module 556, reassembly queues 558, a packet constructor 560, an optional random early discard (RED) block 564, packet queues 566, and free buffer queues 568. The packet constructor 560 includes in-progress buffers 561 and a reassembly engine 562. Cells are received on HSIs 550 at the receive module 552. HSIs 550 include one HSI per fabric module through which cells are forwarded (see, e.g., FIG. 2). In an embodiment, the receive module 552 includes a simple streaming buffer. The cells are stored in the packet memory 554. In an embodiment, the cells are written to the packet memory 554 once upon arrival from the HSIs 550 and read once when transmitted on interface 570 from the transmit module 556. Except for writes by the receive module 552 and reads by the transmit module 556, operations on cells or packets are actually on the pointers to the corresponding cells or packets. This representation of cells by pointers may be referred to as token assignment since the relatively large cell is represented by a smaller token (pointer) while the cell is stored in the egress module 208. In an embodiment, the cells of a packet are maintained with a doubly-linked list with each node having a link to the next cell of the same packet and a link to the next packet in the same queue. Though there are various queues, the queues are maintained as doubly-linked lists to maintain consistency. However, this is not critical.

A portion of the packet memory 554 is occupied by packets being reassembled, with the actual maximum amount of memory depending upon the depth of the reassembly queues 558. Though cells are forwarded from an ingress in order, when the cells arrive at the receive module 552, they may be out of order. When a cell arrives at the receive module 552, it is directed to a reassembly queue of the reassembly queues 558 to await the arrival of more cells from the ingress at that priority. The egress includes a reassembly queue for cells from each ingress of each priority received via each fabric, for a total of up to 2048 (8 priorities * 64 ingresses * 4 fabrics) reassembly queues 558 in an embodiment. Since packets are assembled from a unique ingress-priority source, it comes natural to divide the number of reassembly queues 558 by the number of fabrics to determine a number of reassembly queue sets (RQSs), yielding 512 RQSs in the embodiment just described. Accordingly, using the RQSs, reassembly is performed on a per-ingress per-priority basis. The RQSs are discussed in more detail below with reference to FIG. 6.

As the reassembly queues 558 enqueue cells, the cells are dequeued and moved to the in-progress buffer 561 of the packet constructor 560 for reassembly by the reassembly engine 562. When a packet is reassembled from each of its component cells, it is either dropped at the RED block 564, if applicable, or enqueued in the packet queues 566 for transmission by the transmit module 556. The RED block 564 is an optional mechanism for managing traffic congestion. In an embodiment, there are as many packet queues as the number of priorities multiplied by the number of destinations. Accordingly, if the transmit module 556 transmits a packet to one of five destinations, there are 40 packet queues 566 (8 priorities * 5 destinations). The free buffer queues 568 supply pointers to available space in the packet memory 554 when buffer space is needed by the receive module 552 and the in-progress buffers 562. As pointers and the packet memory 554 space they represent are made available, for example after cells/packets are removed from the packet memory 554 and sent out by the transmit module 556, they are added to the free buffer queue 568.

In an embodiment, each cell is 64 bytes. Accordingly, if there are 2048 reassembly queues 558, each with a depth of 128 entries, the portion of the packet memory 554 that corresponds to the reassembly queues 558 is 16 MB (2048 queues * 128 entries/queue * 64 bytes/entry=16 MB). In order to prevent the reassembly process from being aborted due to insufficient buffers, a hard limit could be enforced. In an embodiment, this is accomplished by setting a global check in the RED block 564.

Figure 6:
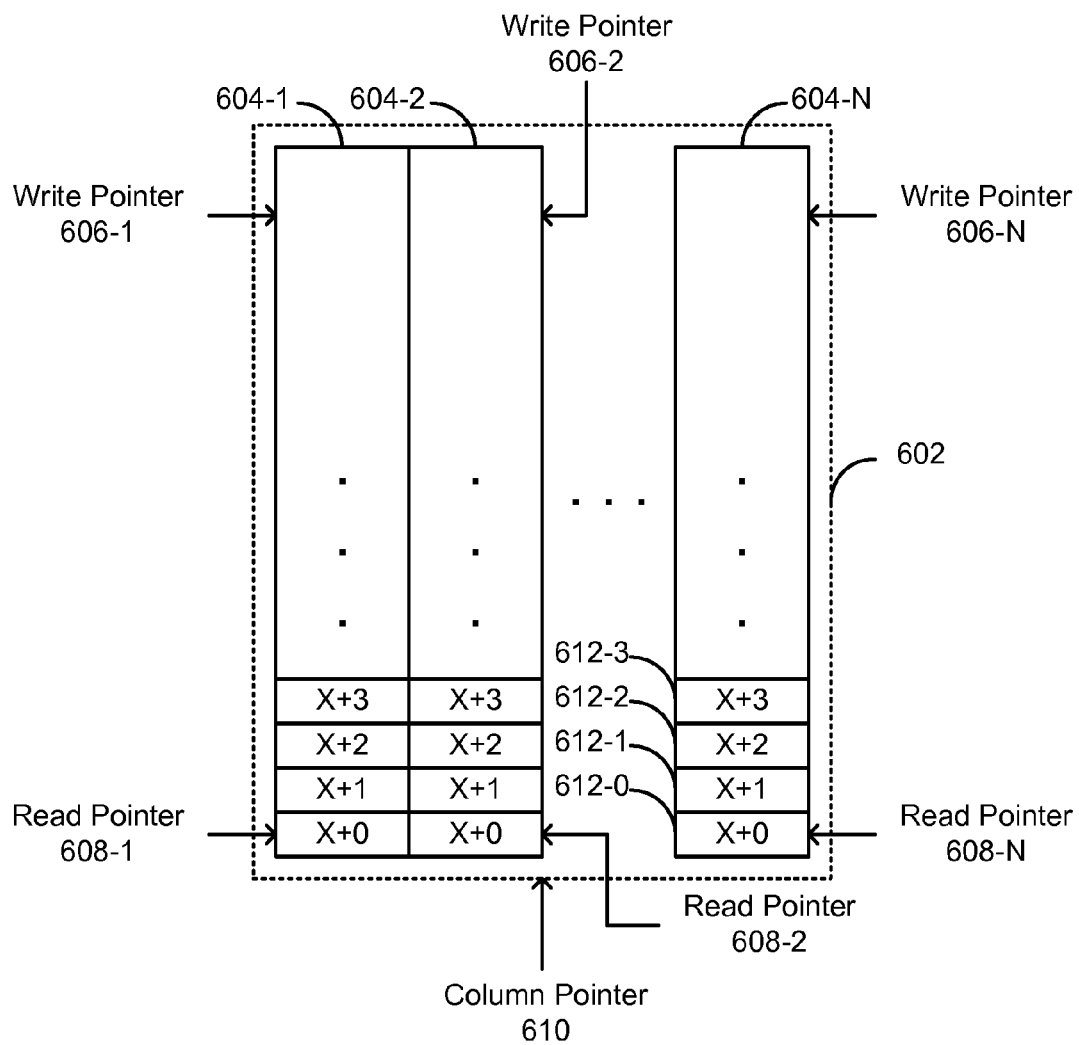
FIG. 6 is a block diagram of a reassembly queue set (RQS) for use with the system of FIG. 1 in an embodiment of the invention.

FIG. 6 is a block diagram of a RQS subsystem 600 for use with the system 100 (FIG. 1) in an embodiment of the invention. The subsystem 600 includes a RQS 602 and a plurality of pointers 606-610. The RQS 602 includes reassembly queues 604-1 to 604-N (collectively referred to as reassembly queues 604). The plurality of pointers 606-610 includes write pointers 606-1 to 606-N (collectively referred to as write pointers 606), read pointers 608-1 to 608-N (collectively referred to as read pointers 608), and a column pointer 610. The write pointers 606 point to the tails of their respective reassembly queues 604. When a cell is enqueued in a reassembly queue, it is at the tail of the reassembly queue in accordance with its write pointer. The read pointers 608 point to the heads of their respective reassembly queues 604. When a cell is dequeued from a reassembly queue, it is from the head of the reassembly queue in accordance with its read pointer. The column pointer 610 points to the reassembly queue that is to be dequeued next. In an embodiment, the column pointer 610 sweeps across the reassembly queue heads. For the purposes of illustration, it is assumed the column pointer 610 sweeps across the reassembly queue heads from left to right. If a cell is enqueued at position X+0 in reassembly queue 604-1, then when the column pointer 610 points to the reassembly queue 604-1, the cell is dequeued, the read pointer 608-1 is incremented to position X+1 and the column pointer 610 is incremented to reassembly queue 604-2. If a cell is enqueued at position X+0 of reassembly queue 604-2, then when the cell is dequeued, the read pointer 608-2 is incremented to position X+1, and the column pointer 610 would be incremented to the next reassembly queue 604. Eventually, the column pointer 610 points to the last reassembly queue 604-N at position X+0. If a cell is dequeued at position X+0, and the cell is dequeued, the read pointer 608-N is incremented to position X+1, and the column pointer 610 is incremented back to the first reassembly queue 604-1. It should be noted that in an alternative embodiment, there are no read pointers 608 and the column pointer 610 is used to both indicate the next reassembly queue from which a cell is to be dequeued and to serve as a read pointer.

The RQS 602 may occasionally receive out of order cells in a reassembly queue 604-N. If the RQS 602 is a unicast RQS, then a ROWID 326 (FIG. 3A) associated with a cell may be used to determine that the cell is received out of order and the appropriate measures may be taken, such as flushing the reassembly queue 604-N. In an embodiment, the ROWID 326 is 2 bits long. The 2 bits of the ROWID 326 correspond to the least significant bits of a memory location in which the cell is to be stored. For example, memory locations 612-0 to 612-3 represent 4 contiguous memory locations with least significant bits of 0, 1, 2, and 3, respectively. An ingress is synchronized with the RQS 602 such that a cell should have a ROWID 326 that corresponds to the least significant bits of the memory locations 612-0 to 612-3. Accordingly, if a cell with a ROWID 326 having a value of 0 is located at position 612-0, the cell was probably received in order. In another embodiment, a two bit counter is maintained. The two bit counter is incremented each time the column pointer 610 wraps around from the column 604-N to the column 604-1 (indicating a complete row has been read/dequeued from the RQS 602). Accordingly, if a cell with a ROWID 326 is scheduled to be dequeued and the ROWID 326 does not match the two bit counter, then a cell ordering error has occurred. The two bit counter would be initialized to match the starting ROWIDs before allowing traffic to pass. It should be noted that if a cell was received 4 locations out of order, the ROWID 326 could actually appear to be in the correct memory location. However, errors of this magnitude are rare in at least the present embodiment. Of course, if the error were sufficiently likely, the ROWID 326 could be made 3 or more bits long. It should further be noted that this technique is difficult to implement with multicast cells, since synchronizing an ingress to multiple egresses becomes complex when multicasting a cell. For example, the ROWID 326 could very well be different for each destination. For this reason, in an embodiment, multicast error correction does not use the ROWID 326.

Figure 7A:
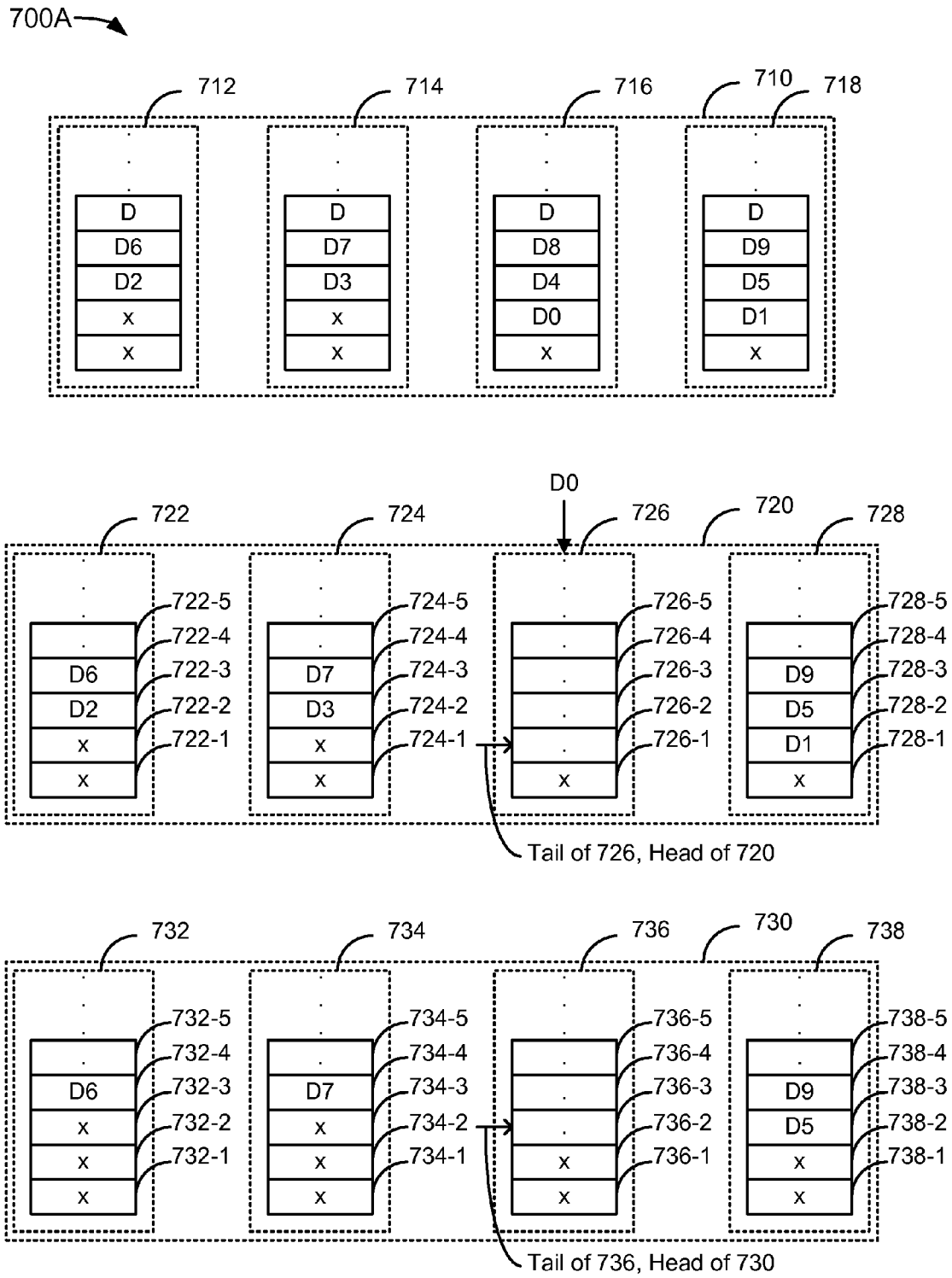
FIGS. 7A-7B are block diagrams of exemplary queues for use with the system of FIG. 1 in an embodiment of the invention.
Figure 7B:
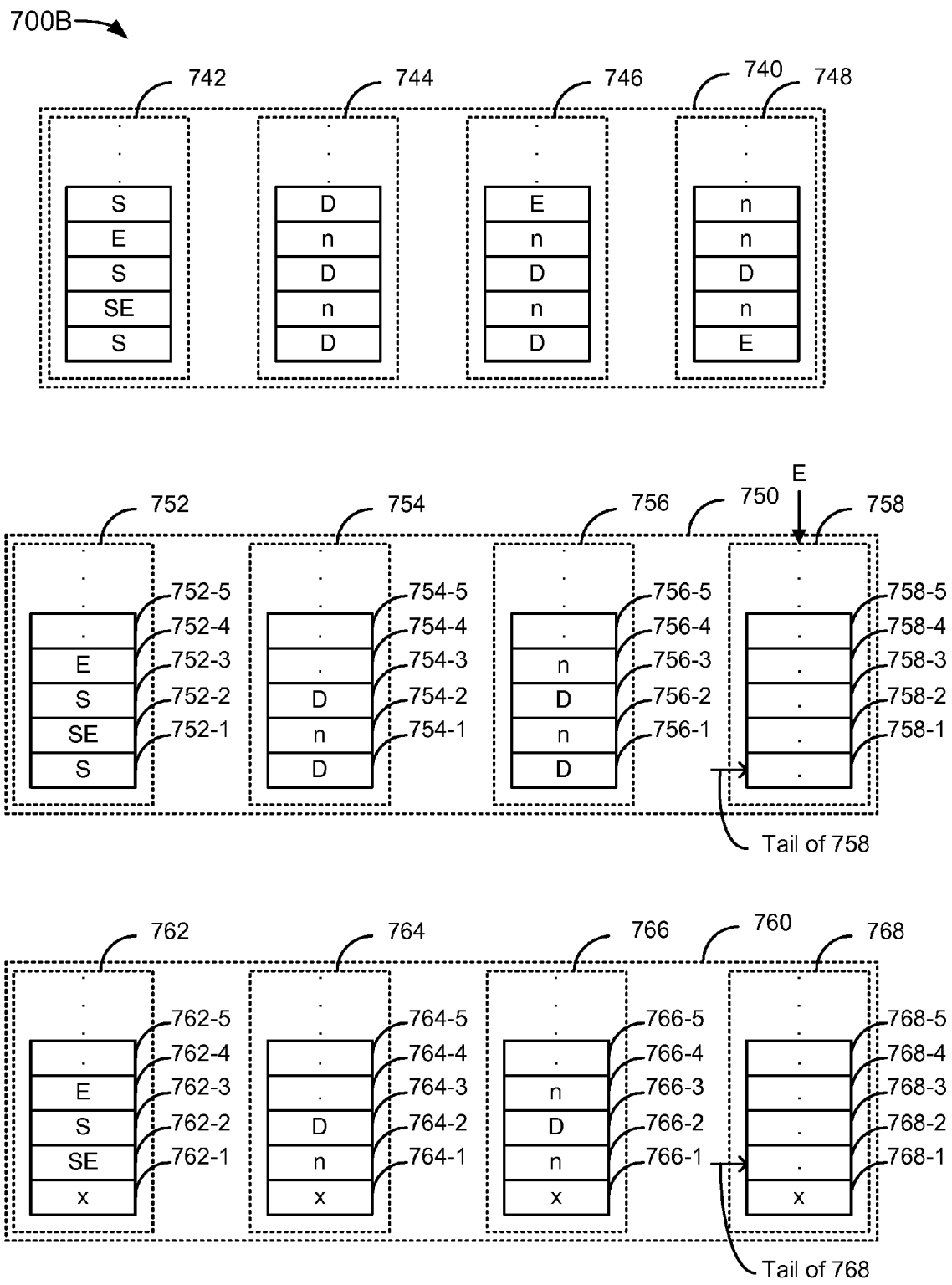

FIGS. 7A and 7B are block diagrams of exemplary queues 700A and 700B for use with the system 100 (FIG. 1) in an embodiment of the invention. The exemplary queues 700A include inputs 710 and RQS 720 (RQS 730 is the same as RQS 720, except some cells have been dequeued). In this example, the inputs 710 include four input flows 712, 714, 716, and 718 that correspond to four switching fabrics. The input flows 712, 714, 716, and 718 include data cells that are ordered D0 to D9. For the purposes of this example, the inputs 710 are transmitted to the switching fabrics approximately in order. The data cells may not be received at the RQS 720 in the order they are sent, but, in an embodiment, data cells received from a single switching fabric will be received in the order they were sent to the switching fabric unless an error has occurred. The RQS 720 includes four reassembly queues 722, 724, 726, and 728. For the purposes of this example, an "x" in a cell location indicates a data cell has already been sent from the ingress, received at the egress, and dequeued from the reassembly queues. Each reassembly queue includes cell locations 722-1 to 722-5, 724-1 to 724-5, 726-1 to 726-5, and 728-1 to 728-5, respectively. There may be additional cell locations (not shown) up to an established reassembly queue depth (e.g., up to a depth of 128). For the purposes of example, assume the ingress has sent data cells D0 to D9 and that the data cells D0 to D9 have not yet been dequeued. As illustrated in FIG. 7A, reassembly queue locations 1-4 have been filled with data cells for the reassembly queues 722, 724, and 728. However, the reassembly queue 726 is in the process of receiving the data cell D0. After reception, the data cell D0 is enqueued in reassembly queue 726 at the tail of the queue. Since the other reassembly queues already contain the data cells D1-D3, these cells may now be dequeued without loss of ordering. Accordingly, the data cells D0 to D3 are dequeued, and the resultant RQS is represented by RQS 730, which includes reassembly queues 732, 734, 736, and 738 that correspond to reassembly queues 722, 724, 726, and 728.

The data cells of exemplary queues 700A are assumed to be continuations of one another. In other words, enqueuing and dequeuing cells need not be dependent upon the EOP flags. Moreover, there is no requirement that cells be dequeued from all reassembly queues within a RQS simultaneously, though the cells should be dequeued in order (e.g., for FIG. 7A, the data cell D5 cannot yet be dequeued because the data cell D4 has not been received). Accordingly, if a RQS contained an EOP cell preceded by only received cells and dequeued cells, it could be dequeued regardless of which reassembly queue it was in. This is advantageous to avoid a last packet ending on an odd cell boundary getting stuck for lack of further traffic. In an embodiment, multicast cells that do not have a continuation bit set are handled differently, which is explained with reference to FIG. 7B.

The exemplary queues 700B include inputs 740 and RQS 750 (RQS 760 is the same as RQS 750, except some cells have been dequeued). In this example, the inputs 740 include four input flows 742, 744, 746, and 748 that correspond to four switching fabrics. The input flows 742, 744, 746, and 748 include cells represented as "S" for a SOP cell, "D" for an intermediate data cell, "E" for an EOP cell, "SE" for a one-cell packet, having both a SOP and an EOP indicator, and "n" for a null cell. In an embodiment, null cells are sent after an EOP cell that does not have a continuation bit set. The null cells serve as padding to keep multicast packets aligned on a starting fabric, which, in this example, corresponds to input flow 742. The RQS 750 includes four reassembly queues 752, 754, 756, and 758. Each reassembly queue includes cell locations 752-1 to 752-5, 754-1 to 754-5, 756-1 to 756-5, and 758-1 to 758-5, respectively. For the purposes of example, assume the ingress has sent each of the cells illustrated in the inputs 740. Reassembly queue locations 752-1 to 752-4, 754-1 to 754-3, and 756-1 to 756-4 have been filled with cells for the reassembly queues 752, 754, and 756. However, the reassembly queue 758 is in the process of receiving an EOP cell. When the EOP cell is received, the heads of each of the reassembly queues contain cells. Then, the cells are dequeued and the heads of the reassembly queues are incremented to a next location, as illustrated in RQS 760. In another embodiment, null cells are not sent after an EOP cell that does not have its continuation bit set. In this case, cells will be dequeued from all reassembly queue locations starting from the left and ending with a first EOP cell or ending with a data cell in the rightmost reassembly queue if no EOP cell heads a reassembly queue and all reassembly queues starting from the left to the ending position are non-empty. Each time such a dequeuing takes place, the RQS head position returns to the leftmost reassembly queue.

Figure 8A:
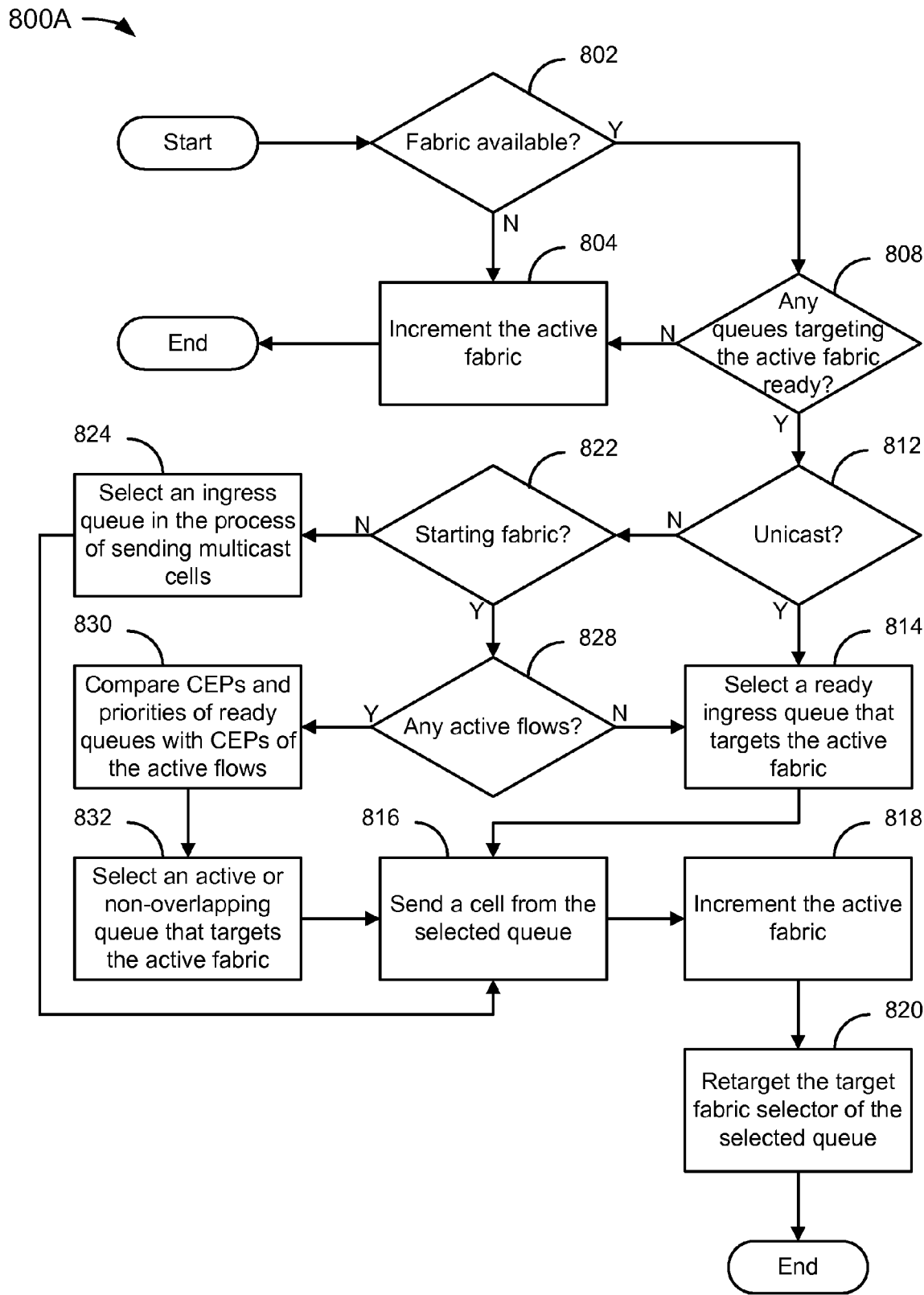
FIGS. 8A-8C are flowcharts of methods in accordance with embodiments of the invention.

FIG. 8A is a flowchart 800A of a method in accordance with an embodiment of the invention. Flowchart 800A is intended to illustrate one cycle of a striping sequence at an ingress, whereby a cell is forwarded on one HSI of a plurality of HSIs. To send cells, one at a time, to each of the switching fabrics to which each of the HSIs are coupled, the flowchart 800A is repeated for each HSI in turn. At the start of flowchart 800A, it is assumed each ingress queue targets a fabric and one of the fabrics is an active fabric.

The flowchart 800A starts at decision point 802 where it is determined whether the active fabric is available. A fabric is available if it is possible to send data traffic across it. If a fabric is full, it is still considered available, but ingress queues will not target it. Rather, the ingress queues will wait for the fabric to become non-full. If an active fabric is not available (802-N), the active fabric is incremented at step 804, and the flowchart 800A ends. If an active fabric is available (802-Y), then at decision point 808 it is determined whether any queues targeting the active fabric are ready to send cells. An ingress queue is ready if it has cells for forwarding and its target fabric selector points to the active fabric. If there are no ready ingress queues, then the active fabric is incremented at step 810 and the flowchart 800A ends. Otherwise, if any ingress queues that target the active fabric are ready to send cells, then it is determined whether the ingress queue is a unicast ingress queue at decision point 812. If the ingress queue is unicast, then one of the ready ingress queues that currently targets the active fabric is selected in accordance with an arbitration algorithm at step 814, a cell is sent from the selected ingress queue at step 816, the active fabric is incremented at step 818, the selected ingress queue's target fabric selector is retargeted to the next available fabric at step 820, and the flowchart 800A ends.

If at decision point 812 it is determined that the ingress queue is not unicast (i.e., the queue is multicast), then at decision point 822 it is determined whether the active fabric is a starting fabric for multicast ingress queues. If not, then an ingress queue that is in the process of sending a multicast packet (or null cells) is selected at step 824 and it is determined whether the next cell of the selected queue is a continuation cell. The next cell is a continuation cell if the cell preceding the next cell in the queue had its continuation bit set. The cell is sent from the selected queue at step 816, the active fabric is incremented at step 818, the selected ingress queue's target fabric selector is retargeted to the next available fabric at step 820, and the flowchart 800A ends. For multicast cells, the selected ingress queue's target fabric selector is retargeted to the next available fabric (if either the cell was a continuation cell or was not an EOP cell) or set to the multicast starting fabric (if the cell was an EOP cell and not a continuation cell, and the multicast starting fabric is available) or set to the next available fabric after the starting fabric (if the cell was an EOP cell and not a continuation cell, but the multicast starting fabric is not available). If at decision point 822 it is determined that the active fabric is a multicast starting fabric, then at decision point 828 it is determined whether there are any active flows. A flow is considered active if the last cell sent from that flow was not an EOP cell with the continuation bit cleared. If there are no active flows, then a ready ingress queue that targets the active fabric is selected at step 814 and the flowchart 800A continues as previously described. If there are active flows, then the CEPs and priorities of ready ingress queues are compared with the CEPs and priorities of the active flows at step 830, an active or non-overlapping ingress queue that targets the active fabric is selected at step 832, a cell is sent from the selected ingress queue at step 836, and the flowchart 800A continues at step 816 as previously described.

Figure 8B:
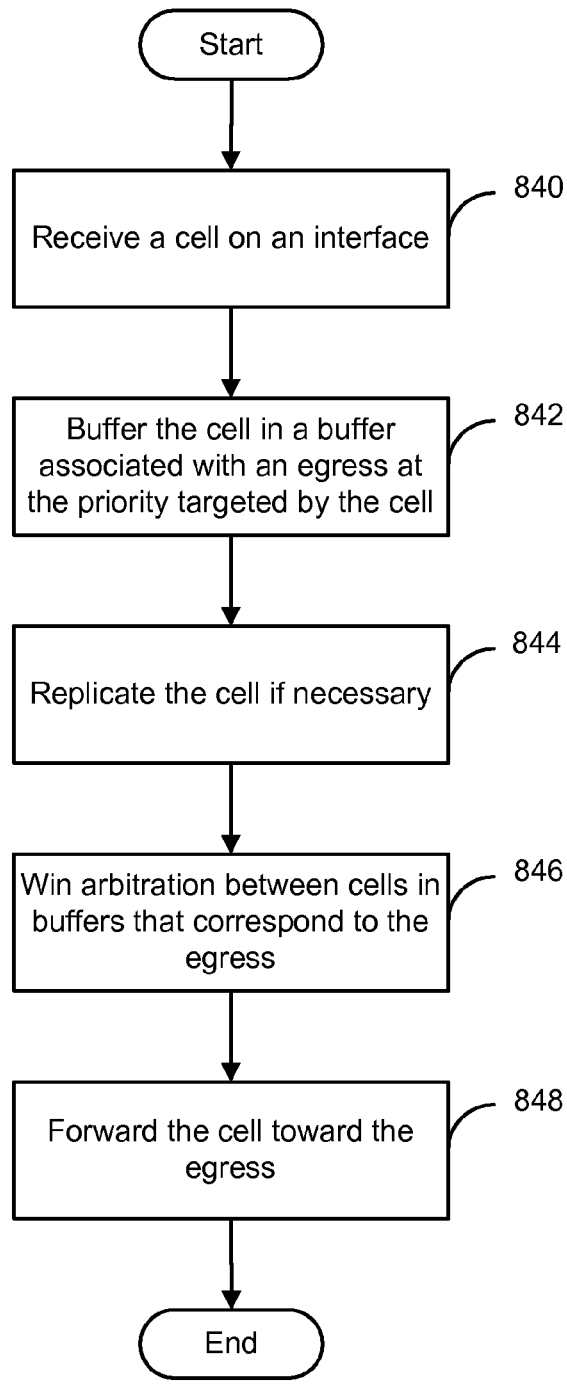

FIG. 8B is a flowchart 800B of a method in accordance with an embodiment of the invention. Flowchart 800B is intended to illustrate the forwarding of a cell through a switching fabric. It is assumed prior to the start of flowchart 800B that the cell targets an egress. The flowchart 800B starts with receiving the cell on an interface at step 840. The cell is buffered in a buffer that is associated with the egress at the priority targeted by the cell at step 842. The cell is replicated if necessary at step 844. Replication may be necessary for multicast cells. After winning arbitration between cells in buffers that are associated with the egress at step 846, the cell is forwarded toward the egress at step 848 and the flowchart 800B ends.

Figure 8C:
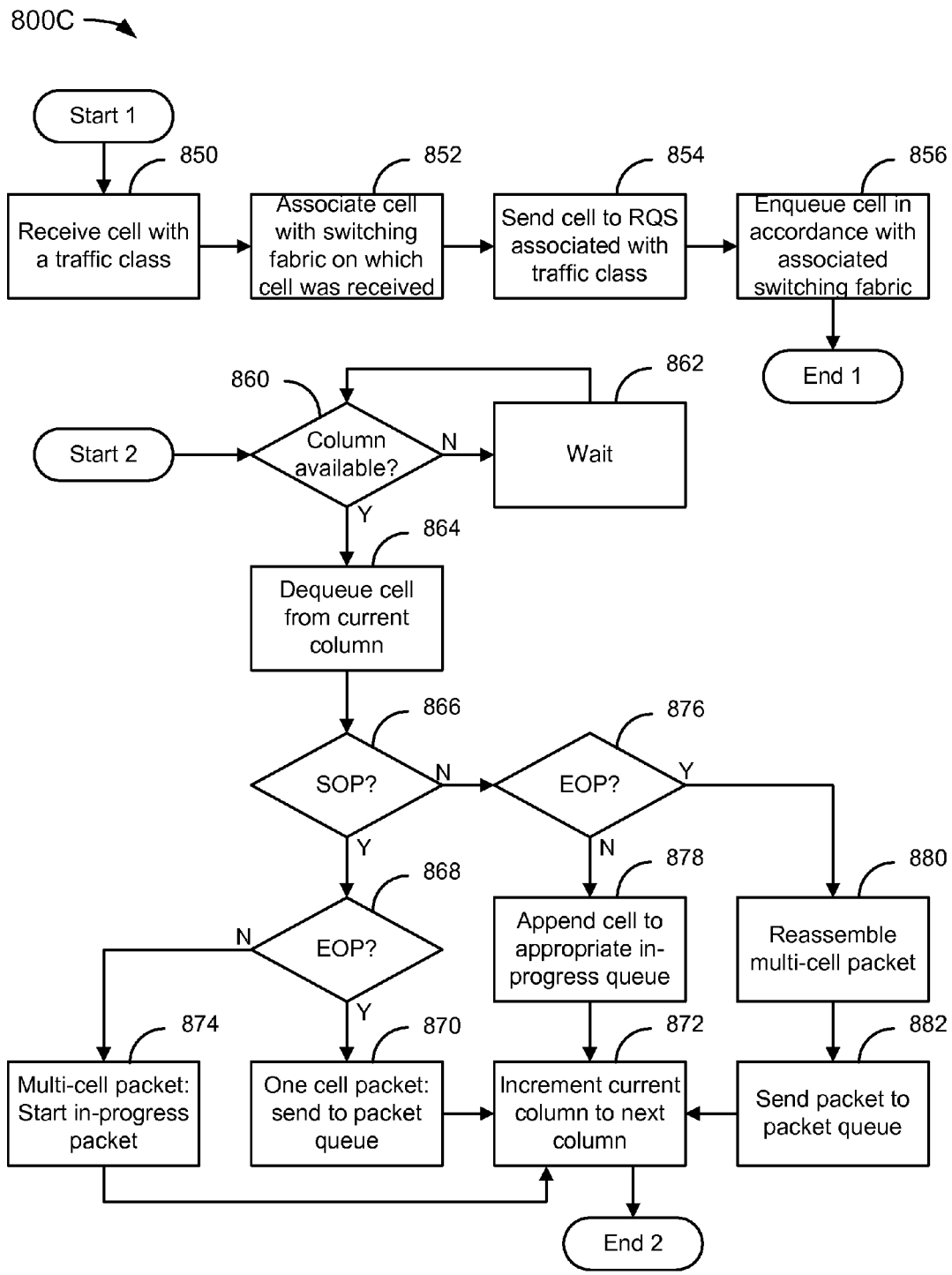

FIG. 8C is a flowchart 800C of a method in accordance with an embodiment of the invention. Flowchart 800C is intended to illustrate the enqueuing and dequeuing of cells in a RQS at an egress. Since dequeued cells are reassembled into packets, repetition of the flowchart 800C illustrates a method of reassembling cells into packets. The flowchart 800C starts at "start 1" with receiving a cell with a traffic class at step 850. The traffic class may include a priority, an IOE, or some other traffic data. The cell is associated with the switching fabric on which it was received at step 852. The cell is sent to a RQS associated with the traffic class of the cell at step 854. The cell is enqueued in accordance with the switching fabric associated with the cell at step 856. And the flowchart 800C ends at "end 1" after the cell is enqueued in the appropriate column of the RQS.

To dequeue a cell, the flowchart 800C starts after "start 2" at decision point 860 where it is determined whether a column is available for dequeueing. A column is available if a cell is at the head of the column at a first memory location and all preceding columns contain a cell at the first memory location, have already dequeued a cell from the first memory location, or are not in use. If the column is not available, wait at step 862 until the column is available. Note that in some cases, error detection and recovery may be necessary to flush the queue and end the wait at step 862 (not shown). If the column is available, then the cell is dequeued at step 864 and it is determined at decision point 866 whether the cell is a SOP cell. If the cell is a SOP cell, then at decision point 868 it is determined whether the cell is an EOP cell. If the cell is both a SOP and an EOP cell, then the cell is a one-cell packet, which is sent to the packet queue at step 870. Then the current column is incremented to the next column at step 872 and the flowchart 800C ends. If the cell is a SOP, but not an EOP, then it is a multi-cell packet, which is sent to a in-progress queue to start an in-progress packet at step 874. Then the current column is incremented to the next column at step 872 and the flowchart 800C ends. If at decision point 866 it is determined that the cell is not a SOP cell, then at decision point 876 it is determined whether the cell is an EOP cell. If the cell is neither a SOP cell nor an EOP cell, the cell is appended to the appropriate in-progress queue at step 878. Then the column is incremented to the next column at step 872 and the flowchart 800C ends. If the cell is not a SOP cell, but is an EOP cell, then the associated multi-cell packet is reassembled using the cell at step 880 and the reassembled packet is sent to the packet queue at step 882. Then the column is incremented to the next column at step 872 and the flowchart 800C ends.

In one embodiment, the method steps described above are embodied in a computer-readable media as computer instruction code. It shall be appreciated that not all methods steps described must be performed, nor must they be performed in the order stated.

The term packet is defined broadly to include fixed-length cells, variable length packets, and encapsulated data. A packet could be broken into a plurality of smaller cells. As used herein, the term packet could refer to a flow of the plurality of cells or a single cell of such a flow.

Although specific embodiments of the invention have been described and illustrated, the invention is not to be limited to the specific forms or arrangements of parts as described and illustrated herein. The invention is limited only by the claims.

What is claimed is:

1. A method of reassembling packets received across a plurality of switching fabrics, comprising:
   associating a reassembly queue set (RQS) with a traffic class, wherein said RQS includes a plurality of reassembly queues, wherein each reassembly queue of said RQS corresponds to an independent switching fabric of said plurality of switching fabrics;
   receiving cells, wherein each cell has an associated traffic class, and wherein each cell is received on one of said plurality of switching fabrics;
   enqueuing the received cells in said plurality of reassembly queues of the RQS in accordance with the associated traffic class of each cell and the switching fabric on which each cell is received;
   dequeuing cells in round robin fashion from said plurality of reassembly queues; and
   reassembling packets from the dequeued cells.

2. The method of claim 1, further comprising maintaining one RQS for each ingress of a plurality of ingresses.

3. The method of claim 1, further comprising initializing said RQS to a starting position, wherein said starting position comprising a first queue.

4. The method of claim 1, said dequeuing further comprising waiting until a plurality of cells are enqueued.

5. The method of claim 1, said reassembling further comprising:
   accumulating said dequeued cells at an in-progress buffer; and
   reassembling the accumulated cells into a packet if the dequeued cells include an end-of-packet cell.

6. The method of claim 1, further comprising:
   marking a first unicast cell with a rotating row identifier;
   enqueuing said first unicast cell in a first row of a first queue;
   comparing said row identifier with said first row;
   flushing said first queue if a row identifier mismatch is detected; and
   reinitializing said first queue if said row identifier mismatch is detected.

7. The method of claim 1, wherein a first multicast cell is an end-of-packet cell, further comprising:
   marking a first multicast cell with a continuation indicator;
   enqueuing said first multicast cell in a first row of a first queue;
   enqueuing a second multicast cell in said first row of said first queue while said first multicast cell is enqueued;
   dequeuing said first multicast cell; and
   dequeuing said second multicast cell.

8. The method of claim 1, further comprising:
   skipping queues associated with unavailable switching fabrics during said enqueuing; and
   skipping queues associated with unavailable switching fabrics during said dequeuing.

9. The method of claim 1, further comprising:
   adding another queue to the RQS, wherein the added queue is associated with a newly available switching fabric of the plurality of switching fabrics.

10. A system for reassembling packets received across a plurality of switching fabrics, comprising:
    a packet memory;
    a receive interface configured to receive cells striped across a plurality of switching fabric modules via respective high speed interfaces (HSIs) for storage in said packet memory;
    a plurality of reassembly queues configured to queue received cells, wherein said plurality of reassembly queues are logically divided into reassembly queue sets (RQSs) that include one reassembly queue per switching fabric module of said plurality of switching fabric modules;
    a packet constructor configured to:
       accumulate cells in-order as said cells are dequeued from said reassembly queues;
       reassemble one or more of said cells into a packet when an end-of-packet (EOP) cell is dequeued from one of said reassembly queues;
    a packet queue configured to enqueue said packet; and
    a transmit interface configured to dequeue said packet and send said packet from said packet memory.

11. The system of claim 10, further comprising:
    said plurality of switching fabric modules coupled to said receive interface by said respective HSIs; and
    a plurality of ingress modules coupled to said plurality of switching fabric modules by a set of respective HSIs.

12. The system of claim 10, said reassembly queues comprising:
    a number of reassembly queues equal to a number of said plurality of ingress modules multiplied by a number of said plurality of switching fabric modules multiplied by a number of cell traffic classes.

13. The system of claim 10, an RQS of said RQSs further comprising:
    a subplurality of said reassembly queues, wherein said reassembly queues have a head from which cells are dequeued and a tail onto which cells are enqueued, and wherein said subplurality of reassembly queues are arranged in order from a first reassembly queue to a last reassembly queue and back to said first reassembly queue;
    write pointers associated with each of said subplurality of said reassembly queues, wherein said write pointers point to the tails of said reassembly queues;
    a column pointer associated with said RQS, wherein said column pointer points to the head of a reassembly queue of said subplurality of reassembly queues, and wherein when a cell is dequeued from the head of said reassembly queue, the column pointer is incremented to a next reassembly queue of said subplurality of reassembly queues.

14. The system of claim 10, wherein said packet constructor is further configured to:
    exclude a reassembly queue from said reassembly queues from which said cells are dequeued, when said reassembly queue is associated with an unavailable switching fabric; and
    include said reassembly queue in said reassembly queues from which said cells are dequeued, when said reassembly queue is associated with an available switching fabric.

15. A packet forwarding device, comprising:
    one or more ingresses, wherein each ingress includes a plurality of unicast ingress queues and a plurality of multicast ingress queues;
    a plurality of switching fabrics respectively coupled to each of said one or more ingresses by high speed interfaces (HSIs), wherein each switching fabric includes a plurality of buffers that correspond to said unicast ingress queues; and
    one or more egresses respectively coupled to each of said plurality of switching fabrics by HSIs, wherein each egress includes:
    a plurality of unicast reassembly queue sets (RQSs) that correspond to said unicast ingress queues, wherein said unicast RQSs each include a reassembly queue that corresponds to one of said switching fabrics; and a plurality of multicast RQSs that correspond to said multicast ingress queues, wherein said multicast RQSs each include a reassembly queue that corresponds to one of said switching fabrics.

16. The device of claim 15, said egress further comprising:
a packet memory;
a receive interface configured to receive cells striped across said plurality of switching fabric modules via respective HSIs for storage in said packet memory;
a packet constructor configured to:
accumulate cells as said cells are dequeued from said reassembly queues;
reassemble a subplurality of said cells into a packet when an end-of-packet (EOP) cell is dequeued from one of said reassembly queues;
a packet queue configured to enqueue said packet; and
a transmit interface configured to dequeue said packet and send said packet from said packet memory.

17. The device of claim 15, further comprising:
said plurality of switching fabric modules coupled to said receive interface by said respective HSIs; and
a plurality of ingress modules coupled to said plurality of switching fabric modules by a set of respective HSIs.

18. The device of claim 17, said reassembly queues comprising:
a number of reassembly queues equal to a number of said plurality of ingress modules multiplied by a number of said plurality of switching fabric modules multiplied by a number of cell traffic classes.

19. The device of claim 15, an RQS of said RQSs further comprising:
a subplurality of said reassembly queues, wherein said reassembly queues have a head from which cells are dequeued and a tail onto which cells are enqueued, and wherein said subplurality of reassembly queues are arranged in order from a first reassembly queue to a last reassembly queue and back to said first reassembly queue;
write pointers associated with each of said subplurality of said reassembly queues, wherein said write pointers point to the tails of said reassembly queues;
a column pointer associated with said RQS, wherein said column pointer points to the head of a reassembly queue of said subplurality of reassembly queues, and wherein when a cell is dequeued from the head of said reassembly queue, the column pointer is incremented to a next reassembly queue of said subplurality of reassembly queues.

20. The device of claim 15, wherein said reassembly queues enqueued cells from respective ingress queues, said packet constructor further configured to:
associate a first subplurality of said cells that are received from a first respective ingress queue with a first row of a first RQS;
associate said first subplurality of cells with respective reassembly queues of said first RQS; and
reassemble said first subplurality of cells into one or more packet segments.

21. The device of claim 15, wherein said receive interface is further configured to receive synchronization cells from an ingress module and said reassembly engine is further configured to initialize each RQS to a starting position using said synchronization cells, said egress further comprising:
a synchronization module, including a fabric test block configured to test said switching fabric modules for availability; and
free buffer queues configured to contain cells that are received out of order.

* * * * *